UNITED STATES PATENT OFFICE.

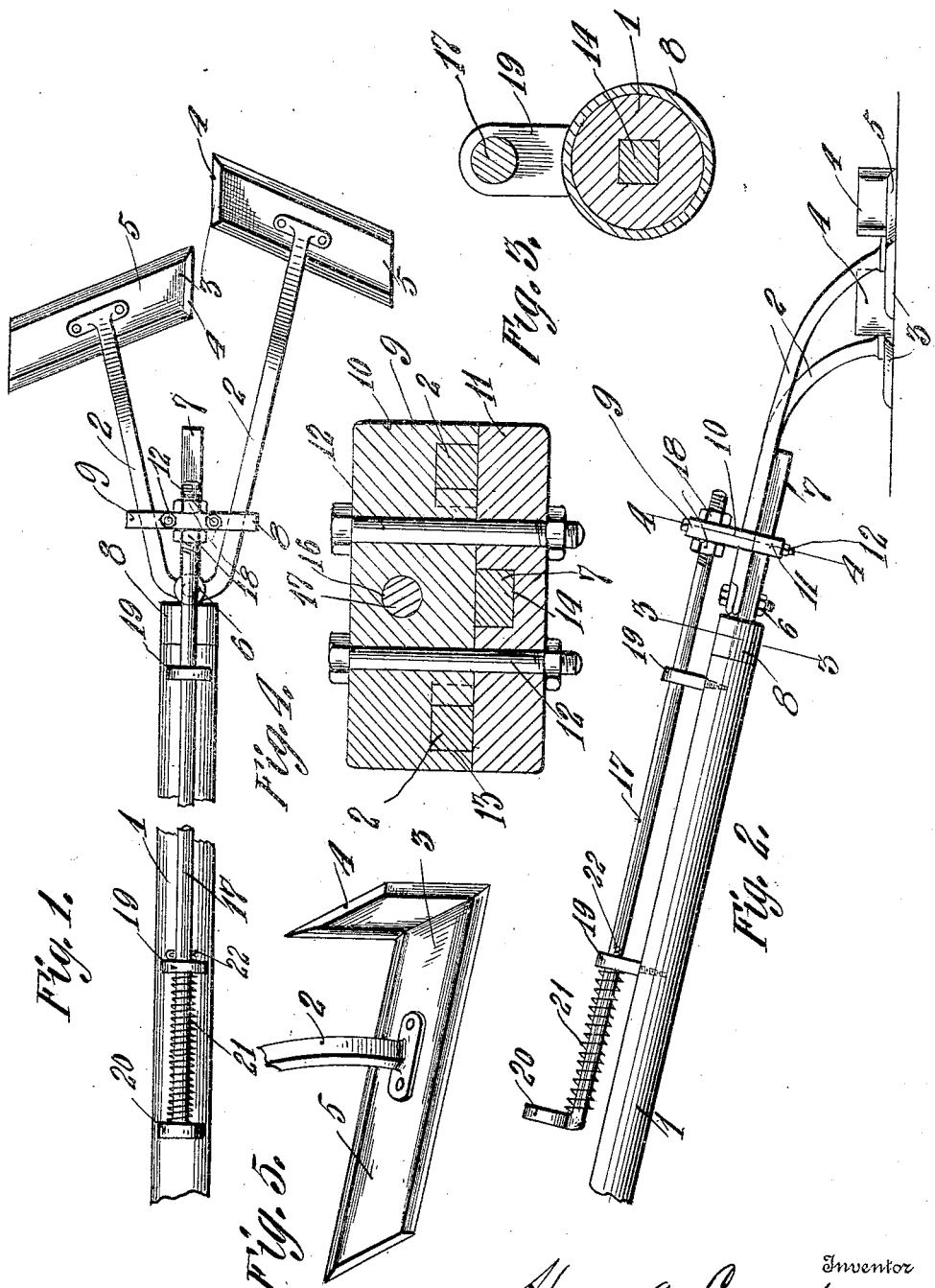

HENRY A. CONGDON, OF SLOCUM, RHODE ISLAND.

HOE.

932,249.

Specification of Letters Patent.  Patented Aug. 24, 1909.

Application filed March 9, 1909. Serial No. 482,347.

*To all whom it may concern:*

Be it known that I, HENRY A. CONGDON, a citizen of the United States, residing at Slocum, in the county of Washington and State of Rhode Island, have invented certain new and useful Improvements in Hoes, of which the following is a specification, reference being had to the accompanying drawings.

This invention is an improved two blade scuffle-hoe, and consists of the novel features of construction and the combination and arrangement of parts hereinafter fully described and claimed.

The object of the invention is to provide a hoe of this character having angular blades mounted for swinging movement toward and from each other, and having means for actuating them as the handle is moved back and forth, whereby the operation of hoeing may be easily and effectively performed.

The above and other objects of the invention are attained in its preferred embodiment illustrated in the accompanying drawings, in which—

Figure 1 is a plan view of the improved two blade scuffle-hoe; Fig. 2 is a side elevation of the same; Figs. 3 and 4 are transverse sections taken, respectively, on the planes indicated by the lines 3—3 and 4—4 in Fig. 2; and Fig. 5 is a detail perspective of one of the angular blades.

The invention comprises a suitable handle 1 to the lower end of which are pivoted two arms 2 carrying angular hoe blades 3. Each of the blades 3 preferably consists of a vertical portion 4 disposed to extend longitudinally and having its front and rear edges beveled to provide cutting edges, and also a horizontal portion 5 which extends rearwardly and outwardly at an angle from the vertical portion 4 and which also has its front and rear edges beveled to provide cutting edges. The two hoes are preferably disposed angularly and in different transverse planes with respect to each other, as shown in Figs. 1 and 2, and their supporting arms 2 are attached to their horizontal blade portions 5, as shown. The arms 2 are arranged angularly with respect to each other, their diverging forward ends which carry the blades being curved downwardly and their converging rear ends being arranged in overlapping relation to receive a bolt 6 or other pivot pin which extends through a shank 7 in the form of a metal bar projecting from the lower end of the handle 1. Said shank or bar 7 is square in cross section and has its end secured in the end of the handle, which latter is strengthened by a metal ferrule 8. The intermediate portions of the arms 2 are preferably square in cross section and slidably arranged upon them is an actuating head 9, shown more clearly in Fig. 4 of the drawings, and consisting of two separable sections 10, 11 united by bolts 12.

In the bottom edge of the upper section 10 are formed angularly arranged grooves or openings 13 for the reception of the arms 2 and in the center of the lower section 11 is formed a groove or opening 14 for the reception of the shank 7 upon which latter the head 9 is adapted to slide. The bolts 12 effectively unite the two sections and retain the parts 2, 2, 7 between them so that the head can reciprocate on said parts and thereby cause the hoe carrying arms 2 to be moved farther from or nearer to each other. In the center of the upper section 10 is an opening 16 to receive the lower end of an operating rod 17, said lower end being threaded to receive nuts 18 disposed on opposite sides of the head 9, whereby the head and rod are adjustably connected. The rod 17 extends longitudinally of the handle upon its upper side and is supported for sliding movement in guide brackets 19. The extreme upper end of the rod 17 is bent to provide a thumb piece or handle 20 and surrounding said portion of the rod between the bent end or handle 20 and the upper guide 19 is a coil spring 21 which actuates the rod upwardly and thereby tends to move the head 9 inwardly upon the diverging arms 2 to spread their blade carrying ends apart. A cotter pin 22 is arranged in the rod and adapted to engage the uppermost guide 19 to serve as a stop to limit the upward movement of the rod under the action of the spring 21 and hence to limit the outward or spreading movement of the hoe carrying arms.

In operation, the hoe is moved forward and backward by means of the handle, the blades being disposed on opposite sides of the row of plants being hoed and, by pressing downwardly upon the thumb piece or handle 20, the blades may be moved closer to each other to operate closer to the plant between them. The spring 21 tends to hold the blades apart but owing to the adjustable connection between the rod and the sliding head 9, the amount of opening between the blades may be increased or decreased as desired.

From the foregoing it will be seen that the invention provides an exceedingly simple and practical two blade scuffle-hoe which may be produced at a small cost and will be strong and durable in use.

While I have shown and described in detail the preferred embodiment of the invention, it will be understood that I do not wish to be limited to the precise construction set forth and that various changes in the form, proportion, arrangement of parts and the details of construction may be resorted to without departing from the spirit and scope of the invention.

Having thus described the invention what is claimed is:

1. A scuffle-hoe comprising a handle, a longitudinally projecting shank carried thereby, a transverse cross bar or head having its central portion slidably engaged with said shank and its end portions formed with openings, a pair of rearwardly converging hoe carrying arms arranged in the openings of said cross bar and having their rear ends pivotally mounted and an operating means upon the handle and connected to said cross bar or head.

2. A scuffle-hoe comprising a handle, a flat faced longitudinally extending shank carried thereby, a pair of rearwardly converging hoe carrying arms having their rear ends pivotally mounted, a transversely extending cross bar slidable upon said shank and consisting of separable parts formed in their opposing faces with recesses, one of the latter being centrally arranged and adapted to slidably receive said flat faced shank and the other two being adapted to slidably receive said arms, removable fastenings uniting the parts of said sectional cross bar or head, and an operating means upon the handle and connected to said cross bar or head.

3. An implement of the character described comprising a handle, diverging arms pivoted thereto and carrying hoe blades, a sliding head carried by the handle and engaged with said arms for actuating them toward and from each other, an operating rod upon the handle, an adjustable connection between said rod and said head, a spring for actuating the head and rod in one direction and means for limiting the movement of said head and rod under the action of said spring.

4. An implement of the character described comprising a handle, a shank projecting therefrom, a sliding head on said shank and formed with openings, blade carrying arms pivoted to the shank and slidable in said openings in the head, an operating rod upon the handle to actuate the head in one direction and a spring for actuating said head and rod in the other direction.

5. An implement of the character described comprising a handle, a shank projecting therefrom, a sliding head on said shank and formed with openings, blade carrying arms pivoted to the shank and slidable in said openings in the head, an operating rod upon the handle to actuate the head in one direction, an adjustable connection between said rod and head, a spring for actuating the rod and head in the other direction and means for limiting the movement of the rod under the action of said spring.

In testimony whereof I hereunto affix my signature in the presence of two witnesses.

HENRY A. CONGDON.

Witnesses:
JOHN E. BABCOCK,
KATHERINE L. RODENAN.